(12) United States Patent
Song

(10) Patent No.: US 12,450,689 B2
(45) Date of Patent: Oct. 21, 2025

(54) OBJECT DETECTION METHOD AND DEVICE

(71) Applicant: Nextchip Co., Ltd., Seongnam-si (KR)

(72) Inventor: Ho Hyon Song, Seoul (KR)

(73) Assignee: Nextchip Co., Ltd., Seongnam-si (KR)

( * ) Notice: Subject to any disclaimer, the term of this patent is extended or adjusted under 35 U.S.C. 154(b) by 417 days.

(21) Appl. No.: 18/005,139

(22) PCT Filed: Apr. 29, 2021

(86) PCT No.: PCT/KR2021/005425
§ 371 (c)(1),
(2) Date: Jan. 11, 2023

(87) PCT Pub. No.: WO2022/014831
PCT Pub. Date: Jan. 20, 2022

(65) Prior Publication Data
US 2023/0260080 A1    Aug. 17, 2023

(30) Foreign Application Priority Data

Jul. 14, 2020  (KR) .................... 10-2020-0086968

(51) Int. Cl.
*G06T 3/40*    (2024.01)
*G06T 5/50*    (2006.01)

(52) U.S. Cl.
CPC ............... *G06T 3/40* (2013.01); *G06T 5/50* (2013.01); *G06T 2207/20016* (2013.01); *G06T 2207/20084* (2013.01); *G06T 2207/30252* (2013.01)

(58) Field of Classification Search
CPC ... G06T 3/40; G06T 5/50; G06T 2207/20016; G06T 2207/20084; G06T 2207/30252;
(Continued)

(56) References Cited

U.S. PATENT DOCUMENTS 7,212,217 B1 * 5/2007 Feather ................. G06T 17/005
382/302
7,869,641 B2 * 1/2011 Wetzel .................... G06V 10/25
382/128

(Continued)

FOREIGN PATENT DOCUMENTS

CN    112613336 A * 4/2021 ............. G01S 7/417
EP    3620984 B1 * 4/2024 ............. G06V 20/52
(Continued)

OTHER PUBLICATIONS

Yu et al. "Understanding the Impact of Image Quality and Distance of Objects to Object Detection Performance", Oct. 2023, IEEE (Year: 2023).*

(Continued)

*Primary Examiner* — Aaron W Carter
*Assistant Examiner* — Alejandro Hernandez
(74) *Attorney, Agent, or Firm* — DALY, CROWLEY, MOFFORD & DURKEE, LLP

(57) ABSTRACT

Provided is an object detection method including detecting a first object by using an object detection filter in an original image and images of which resolutions are downscaled and detecting a second object by using a neural network-based object detection model of which an input is a target image that is determined to be one of the original image and the images of which resolutions are downscaled.

13 Claims, 7 Drawing Sheets

(58) Field of Classification Search
CPC ... G06T 7/174; G06T 7/11; G06T 7/70; G06T 3/4053; G06T 7/20; G06V 10/25; G06V 20/56; G06V 20/58; G06V 10/82; G06V 10/40; G06V 10/70; G06V 20/50; G06N 3/02; G06N 3/045
See application file for complete search history.

(56) References Cited

U.S. PATENT DOCUMENTS

| | | | | |
|---|---|---|---|---|
| 8,201,202 | B2* | 6/2012 | Ota | H04N 21/47202 |
| | | | | 725/49 |
| 11,074,716 | B2* | 7/2021 | Lopich | G06V 10/50 |
| 11,750,912 | B2* | 9/2023 | Wada | G06T 7/248 |
| | | | | 348/169 |
| 12,282,083 | B2* | 4/2025 | Va | G01S 13/52 |
| 2012/0328155 | A1* | 12/2012 | Fukuda | G06F 18/2148 |
| | | | | 382/103 |
| 2014/0146996 | A1* | 5/2014 | Vajen | G06T 5/70 |
| | | | | 382/100 |
| 2017/0026552 | A1* | 1/2017 | Tomono | G06V 10/56 |
| 2019/0188502 | A1* | 6/2019 | Hermalyn | G06V 20/56 |
| 2019/0213420 | A1* | 7/2019 | Karyodisa | G06V 20/41 |
| 2019/0279046 | A1 | 9/2019 | Han et al. | |
| 2020/0103909 | A1* | 4/2020 | Feinson | G05D 1/0238 |
| 2020/0175326 | A1* | 6/2020 | Shen | G05D 1/2435 |
| 2020/0334551 | A1* | 10/2020 | Javidi | G06N 5/04 |
| 2021/0097354 | A1* | 4/2021 | Amato | G06V 30/2504 |
| 2021/0152732 | A1* | 5/2021 | Eki | H04N 25/78 |
| 2021/0192212 | A1* | 6/2021 | Liu | G06V 20/10 |
| 2022/0044415 | A1* | 2/2022 | Oberhuber | G06T 7/20 |
| 2022/0108554 | A1* | 4/2022 | Kim | H04N 23/58 |
| 2022/0210317 | A1* | 6/2022 | Takatsuka | G06V 40/161 |
| 2022/0343463 | A1* | 10/2022 | Kappel | G06T 5/73 |
| 2023/0186478 | A1* | 6/2023 | Sun | G06V 10/82 |
| | | | | 382/173 |
| 2024/0420449 | A1* | 12/2024 | Kocamaz | G06V 10/761 |
| 2025/0131573 | A1* | 4/2025 | Hassbring | G06V 10/764 |

FOREIGN PATENT DOCUMENTS

| | | |
|---|---|---|
| KR | 10-1767237 B1 | 8/2017 |
| KR | 10-2018-0070083 A | 6/2018 |
| KR | 10-2019-0014908 A | 2/2019 |
| KR | 10-2112250 B1 | 5/2020 |

OTHER PUBLICATIONS

International Search Report dated Aug. 4, 2021 for International Application No. PCT/KR2021/005425; 4 Pages.

* cited by examiner

OBJECT DETECTION METHOD AND DEVICE

CROSS REFERENCE TO RELATED APPLICATION

This application is a U.S. national stage filing under 35 U.S.C § 371 of PCT Application No. PCT/KR2021/005425 filed on Apr. 29, 2021, and entitled "OBJECT DETECTION METHOD AND DEVICE," which is based on and claims priority to Korean Patent Application No. 10-2020-0086968, filed on Jul. 14, 2020, which applications are each hereby incorporated herein by reference in their entireties.

TECHNICAL FIELD

The following embodiments relate to a method of detecting an object in an image.

BACKGROUND ART

A vehicle supporting advanced driver assistance systems (ADAS) or an autonomous driving vehicle may need to automatically detect objects around the vehicle to assist a user or generate a path for the vehicle. For example, the vehicle may generate an image by capturing the front of the vehicle by using a camera of the vehicle. The generated image may include roads, other vehicles, traffic lights, and people. The vehicle may detect an object in the image and assist the user or generate a path, based on the detected object.

DISCLOSURE OF THE INVENTION

Technical Goals

An aspect provides a method and apparatus for detecting an object in an image. Another aspect also provides a method and apparatus for detecting an object by using a downscaled image.

Technical Solutions

According to an aspect, there is provided an object detection method performed by an electronic device including generating a first image by downscaling an original image to a first resolution; generating a second image by downscaling the original image to a second resolution that is different from the first resolution; detecting at least one first object by scanning at least one of the original image, the first image, and the second image by using a preset object detection filter; determining a target image among the original image, the first image, and the second image; and detecting at least one second object in the target image by using a neural network-based object detection model.

The object detection method may further include storing the original image, the first image, and the second image, in which the detecting the at least one second object in the target image by using the neural network-based object detection model includes detecting the second object in an image that is determined to be the target image among the original image, the first image, and the second image.

The neural network-based object detection model may be based on a convolutional neural network (CNN).

The determining the target image among the original image, the first image, and the second image may include determining, to be the target image, an image of a preset resolution among the original image, the first image, and the second image.

The determining the target image among the original image, the first image, and the second image may include determining the target image among the original image, the first image, and the second image, based on the number of previous objects detected in a previous target image prior to the target image.

The determining the target image among the original image, the first image, and the second image, based on the number of previous objects detected in the previous target image prior to the target image, may include determining whether the number of previous objects is greater than or equal to a first threshold that is preset for a previous resolution of the previous target image, and when the number of previous objects is greater than or equal to the first threshold, determining an image of a resolution that is lower than the previous resolution to be the target image.

The determining the target image among the original image, the first image, and the second image, based on the number of previous objects detected in the previous target image prior to the target image, may include determining whether the number of previous objects is less than a second threshold that is preset for the previous resolution of the previous target image, and when the number of previous objects is less than the second threshold, determining an image of a resolution that is higher than the previous resolution to be the target image.

The electronic device may be included in an autonomous driving vehicle or a vehicle supporting advanced driver assistance systems (ADAS).

According to another aspect, there is provided an electronic device for detecting an object including a processor configured to execute a program for detecting an object and a memory configured to store the program, in which the program includes generating a first image by downscaling an original image to a first resolution; generating a second image by downscaling the original image to a second resolution that is different from the first resolution; detecting at least one first object by scanning at least one of the original image, the first image, and the second image by using a preset object detection filter; determining a target image among the original image, the first image, and the second image; and detecting at least one second object in the target image by using a neural network-based object detection model.

The electronic device may further include a camera configured to generate the original image.

The program may also store the original image, the first image, and the second image in the memory, in which the detecting the at least one second object includes detecting the second object in an image that is determined to be the target image among the original image, the first image, and the second image.

The neural network-based object detection model may be based on a CNN.

The determining the target image among the original image, the first image, and the second image may include determining, to be the target image, an image of a preset resolution among the original image, the first image, and the second image.

The determining the target image among the original image, the first image, and the second image may include determining the target image among the original image, the first image, and the second image, based on the number of previous objects detected in a previous target image prior to the target image.

The electronic device may be included in an autonomous driving vehicle or a vehicle supporting an ADAS.

Effects

A method and apparatus for detecting an object in an image may be provided.

A method and apparatus for detecting an object by using a downscaled image may be provided.

BEST MODE FOR CARRYING OUT THE INVENTION

Figure 1:
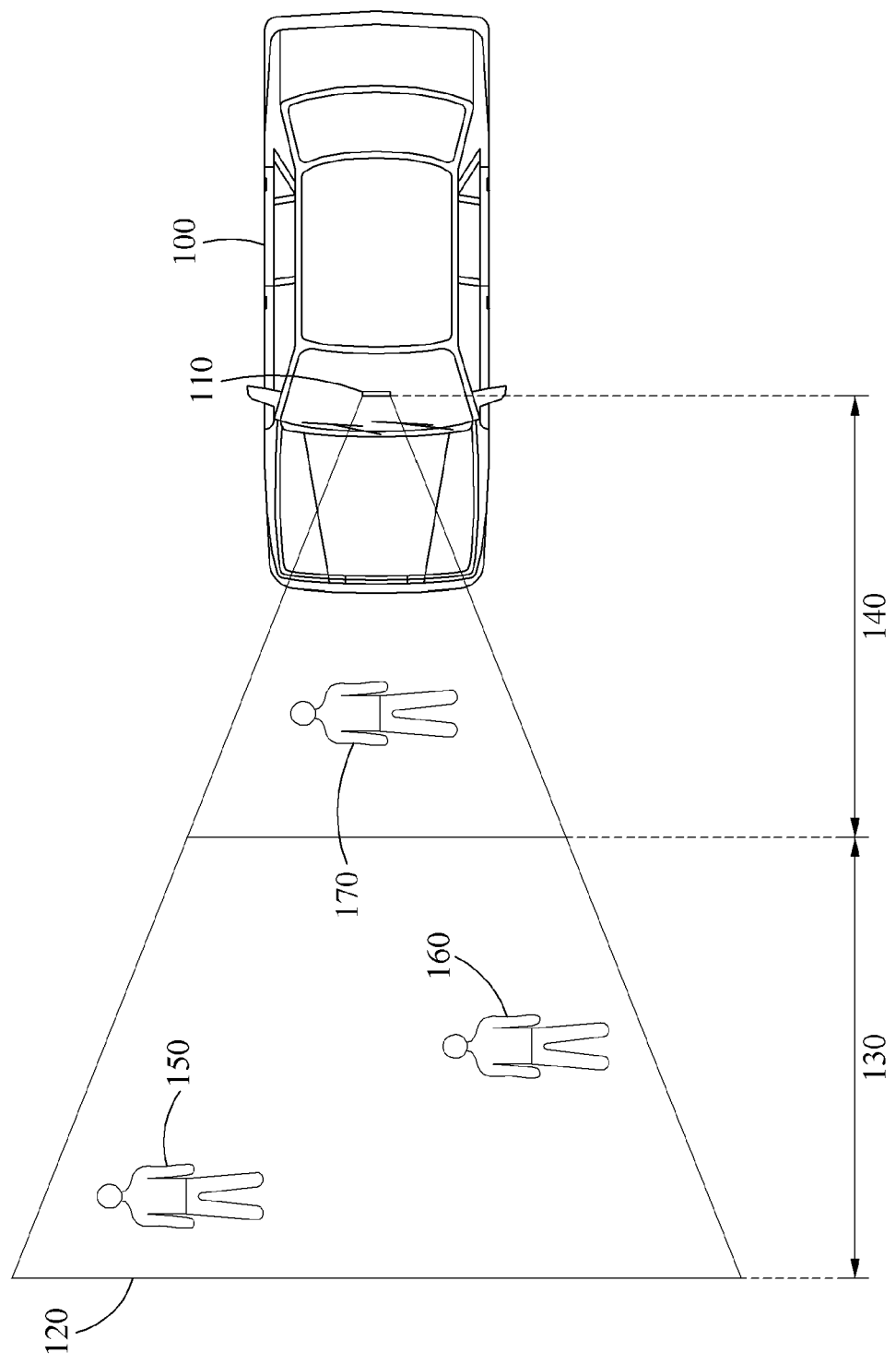
FIG. 1 is a diagram illustrating a method of detecting an object while driving a vehicle, according to an example.

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the example embodiments. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

FIG. 1 is a diagram illustrating a method of detecting an object while driving a vehicle, according to an example.

A vehicle supporting advanced driver assistance systems (ADAS) or an autonomous driving vehicle may need to automatically detect objects around the vehicle to assist a user or generate a path for the vehicle. For example, a vehicle 100 may generate an image by capturing a scene 120 corresponding to the front of the vehicle 100 by using a camera 110 installed in the vehicle 100. The generated image may include objects 150, 160, and 170, such as roads, other vehicles, traffic lights, and people. The vehicle 100 may detect the objects 150, 160, and 170 in the image and may assist a driver or generate a path for the vehicle 100 based on the detected objects 150, 160, and 170. Although the camera 110 is illustrated as facing the front of the vehicle 100 in FIG. 1, the directions of the camera 110 are not limited to the illustrated example, and a camera may capture all directions around a vehicle.

When the accuracy and speed of object detection are low, the safety of an assist function of the vehicle 100 may not be ensured. Accordingly, sufficient accuracy and speed of object detection may be needed. Recently, there has been a demand for detecting an object positioned in a far distance range 130 of the vehicle 100, besides an object positioned in a close distance range 140 of the vehicle 100. Although the close distance range 140 and the far distance range 130 are illustrated as being divided by each boundary in FIG. 1 for ease of description, examples are not limited thereto.

The objects 150 and 160 positioned in the far distance range 130 may not be easily detected because of the small size of the objects 150 and 160 in the image. The object 170 positioned in the close distance range 140 may not be easily detected when the object 170 is covered by another object or distorted through the lens of the camera 110.

According to an aspect, an object detection filter may be used to detect an object in an image, as in a computer vision detection method. The object may be detected by scanning the image through the object detection filter. The type of objects detectable through the object detection filter may be preset. For example, the object detection filter may detect a vehicle and a person.

As the size of the object detection filter increases, the quantity of information in the object detection filter may increase and the accuracy of object detection may increase. In this case, however, the size of a detector may increase and only a large object may be detected. Accordingly, an object positioned in a far distance range in the image may not be easily detected. When the size of the object detection filter is large, to detect the object positioned in a far distance range, the resolution of the image may need to be high.

Such a method of using the object detection filter may have relatively high object detection speed but may be sensitive to object posture transformation and occlusion.

According to another aspect, an object detection model that is pre-trained to detect an object may be used to detect an object in an image.

The object detection model may be a neural network-based object detection algorithm. For example, the object detection algorithm may be based on a deep neural network (DNN). In another example, the object detection algorithm may be based on a convolutional neural network (CNN). The CNN-based object detection algorithm may be an algorithm based on a region-based CNN for recognizing and identifying an object in an image.

A CNN-based object detection model may be less sensitive to object posture transformation and occlusion, compared to the method of using the object detection filter, and may accurately detect an object in an image. However, the CNN-based object detection model may incur a greater amount and time of data processing compared to the method of using the object detection filter. The internal structure of the CNN-based object detection model may vary depending on where to give more weight between the importance of performance and the importance of speed, and hardware may not fix network logic. Accordingly, only some logic, such as a multiply-accumulate (MAC) operation, may be applied to a hardware accelerator by using a graphics processing unit (GPU) or a digital signal processor (DSP). The CNN-based object detection model may have an issue of requiring a considerably greater number of training parameters, compared to the method of using the object detection filter, and requiring a considerably large amount of storage space and input/output data transmission. The severity of the issue may increase as the size (or resolution) of an input image increases. In addition, when the CNN-based object detection model is used in an embedded environment, the resource constraints of the embedded environment may also occur.

As an example, a method of adjusting processing time spent for object detection by suitably adjusting the resolution of an image that is used in the CNN-based object detection model may be used as a solution.

According to an aspect, since the CNN-based object detection model may accurately detect a short-distance object, a method of detecting the short-distance object by using an image of which resolution is adjusted suitably for required processing time (e.g., real-time) while detecting a long-distance object by using an original image and downscaled images may be considered.

Hereinafter, a method of efficiently detecting objects in a scene corresponding to a captured image is described in detail with reference to FIGS. 2 to 7.

Figure 2:
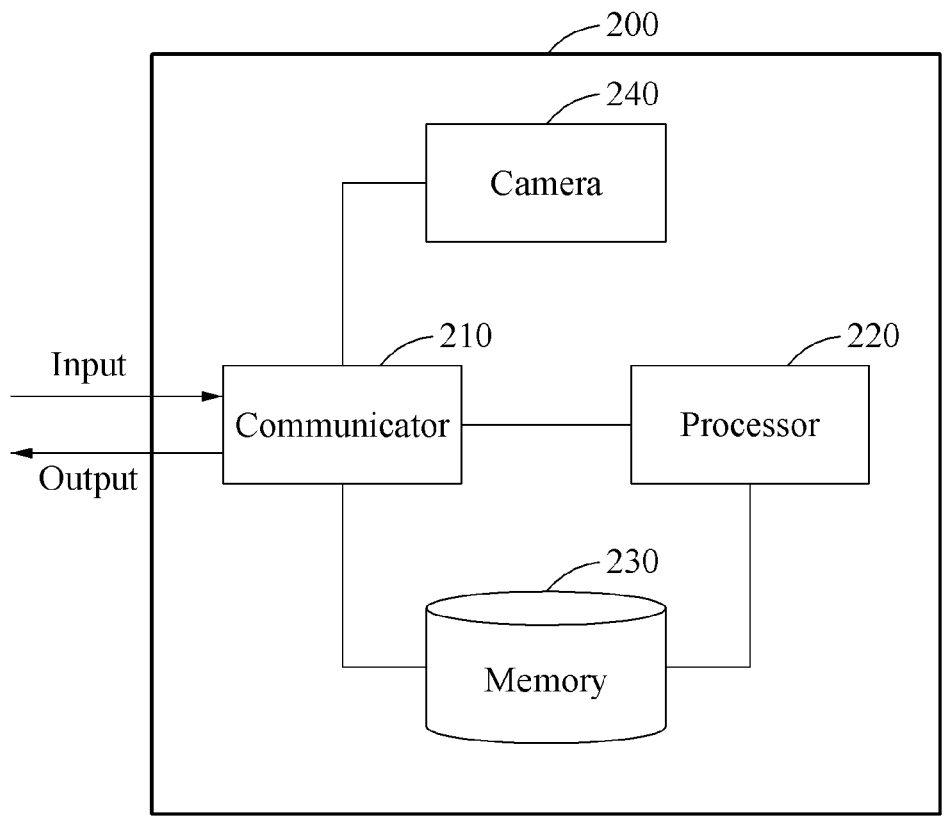
FIG. 2 is a diagram illustrating a configuration of an electronic device according to an example embodiment.

FIG. 2 is a diagram illustrating a configuration of an electronic device according to an example embodiment.

An electronic device 200 may include a communicator 210, a processor 220, and a memory 230. The electronic device 200 may further include a camera 240.

The communicator 210 may be connected to the processor 220 and the memory 230 and transmit and receive data to and from the processor 220 and the memory 230. The communicator 210 may be connected to another external device and transmit and receive data to and from the external device. Hereinafter, transmitting and receiving "A" may refer to transmitting and receiving "information or data indicating A".

The communicator 210 may be implemented as circuitry in the electronic device 200. For example, the communicator 210 may include an internal bus and an external bus. In another example, the communicator 210 may be an element that connects the electronic device 200 to the external device. The communicator 210 may be an interface. The communicator 210 may receive data from the external device and transmit the data to the processor 220 and the memory 230.

The processor 220 may process data that is received by the communicator 210 and stored in the memory 230. A "processor" described herein may be a hardware-implemented data processing device having a physically structured circuit to execute desired operations. For example, the desired operations may include code or instructions in a program. For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

The processor 220 may execute computer-readable code (e.g., software) stored in a memory (e.g., the memory 230) and instructions triggered by the processor 220.

The memory 230 may store data received by the communicator 210 and data processed by the processor 220. For example, the memory 230 may store a program (or an application or software). The stored program may be a set of syntaxes that are coded to detect an object in an image and executable by the processor 220.

According to an aspect, the memory 230 may include at least one volatile memory, non-volatile memory, random-access memory (RAM), flash memory, a hard disk drive, and an optical disc drive.

The memory 230 may store an instruction set (e.g., software) for operating the electronic device 200. The instruction set for operating the electronic device 200 may be executed by the processor 220.

The camera 240 may generate an image by capturing a scene corresponding to a field of view of a camera lens. For example, the generated image may be a digital image.

The communicator 210, the processor 220, the memory 230, and the camera 240 are described in detail below with reference to FIGS. 3 to 7.

Figure 3:
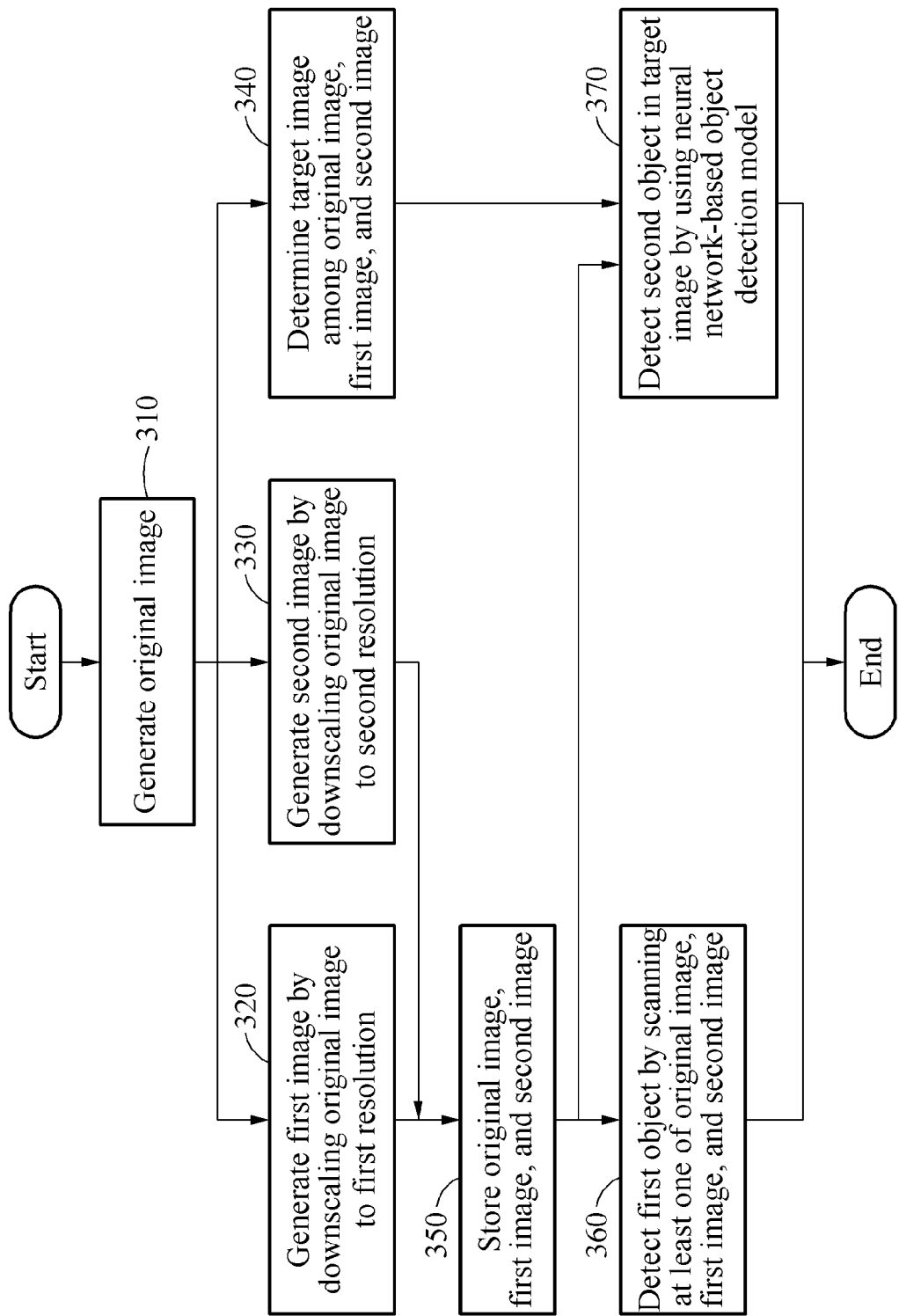
FIG. 3 is a flowchart illustrating an object detection method according to an example embodiment.

FIG. 3 is a flowchart illustrating an object detection method according to an example embodiment.

Operations 310 to 370 described below are performed by the electronic device 200 described above with reference to FIG. 2.

In operation 310, the electronic device 200 may generate an original image. For example, the electronic device 200 may generate an original image of a scene by capturing the scene corresponding to the field of view of the camera 240 by using the camera 240. When the electronic device 200 is included in a vehicle, the captured scene may be the surroundings of the vehicle. For example, the original image may be an image of a maximum resolution that the camera 240 may generate.

In operation 320, the electronic device 200 may generate a first image by downscaling the original image to a first resolution. For example, the electronic device 200 may generate the first image by sampling the original image.

In operation 330, the electronic device 200 may generate a second image by downscaling the original image or the first image to a second resolution that is different from the first resolution.

According to an aspect, the electronic device 200 may further generate additional downscaled images, besides the first image and the second image. As the image processing capability of the electronic device 200 increases, the number of images generated by the electronic device 200 increases.

In operation 340, the electronic device 200 may determine a target image among the original image, the first image, and the second image. The electronic device 200 may determine the target image before generating an actual original image, the first image, and the second image. For example, the electronic device 200 may determine the target image to be used, based on the resolutions of the original image, the first image, and the second image that are to be generated. The determined target image may be used to detect an object in operation 370.

Although operation 340 is illustrated as performed in parallel with operations 320 and 330, operation 340 may be performed after operations 320 and 330.

In operation 350, the electronic device 200 may store the original image, the first image, and the second image. For example, the electronic device 200 may store the original image, the first image, and the second image in the memory 230. The memory 230 may include synchronous dynamic RAM (SDRAM), and images may be stored in the SDRAM.

In operation 360, the electronic device 200 may detect a first object by scanning at least one of the original image, the first image, and the second image by using a preset object detection filter. For example, the electronic device 200 may use a first detector for detecting the first object. The first detector may use the object detection filter. The size of the object detection filter may be predetermined. The type of objects that are detectable by the object detection filter may be preset. A method of detecting the first object in an image by using the object detection filter is described in detail below with reference to FIG. 5.

In operation 370, the electronic device 200 may detect at least one second object in the target image by using a neural network-based object detection model. The object detection model may be a neural network-based object detection algorithm. For example, the object detection algorithm may be based on a CNN. In another example, the object detection algorithm may be based on a DNN. The object detection model may be pre-trained to detect an object.

The at least one second object detected through the object detection model may be partially identical to the first object detected in operation 360 or include an object different from the first object.

Figure 4:
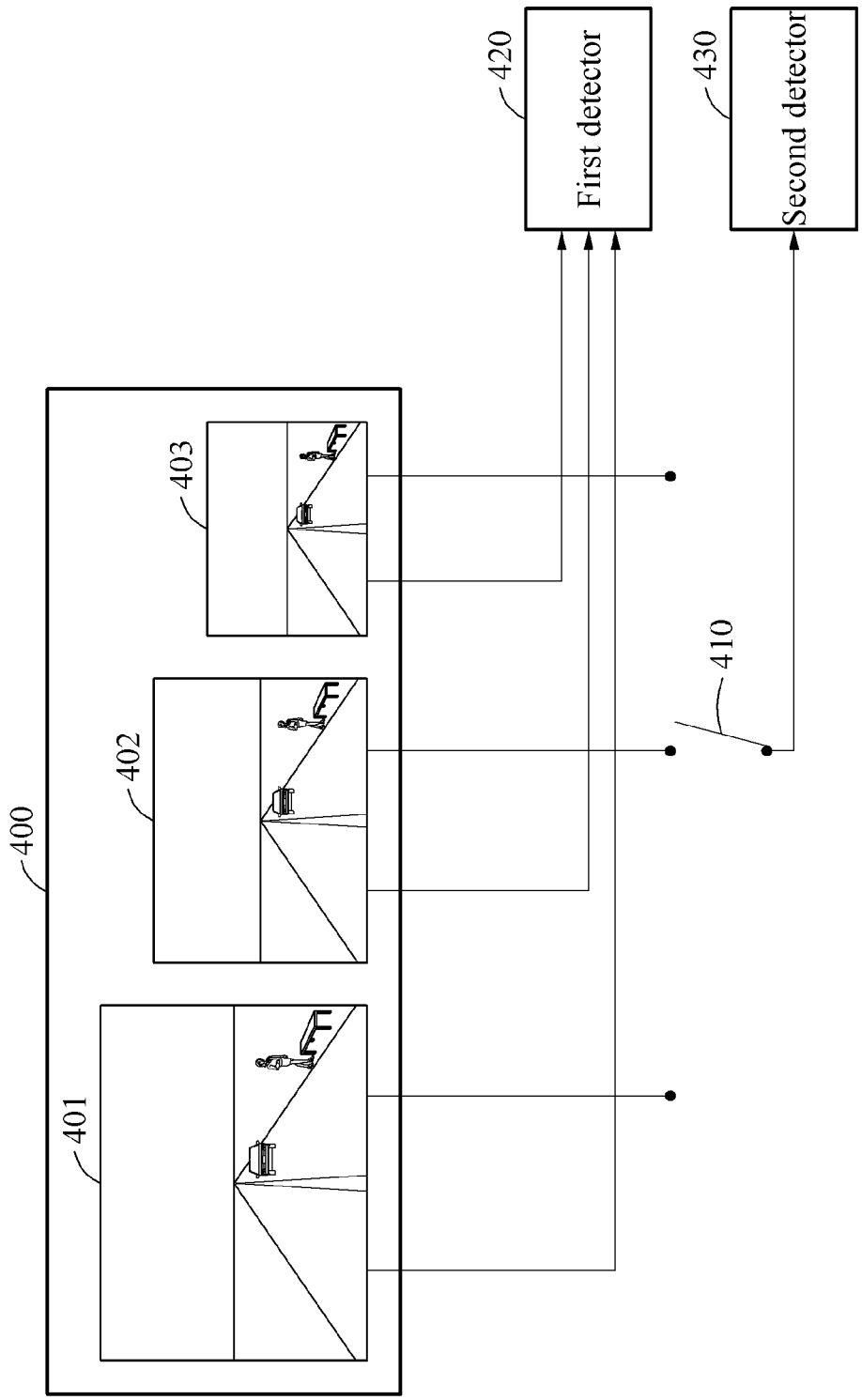
FIG. 4 is a diagram illustrating a method of detecting an object by using a plurality of object detectors, according to an example.

FIG. 4 is a diagram illustrating a method of detecting an object by using a plurality of object detectors, according to an example.

According to an aspect, the memory 230 described above with reference to FIG. 2 may include SDRAM 400. An original image 401, a first image 402, and a second image 403 may be stored in the SDRAM 400.

A first detector 420 may scan the original image 401, the first image 402, and the second image 403 through an object detection filter and detect, as a first object, objects in the original image 401, the first image 402, and the second image 403. For example, the first detector 420 may include software and hardware for performing operation 360 described above with reference to FIG. 3.

An object in the original image 401 and an object in the first image 402 that correspond to each other may be detected as the same object. For example, detected objects may be considered to the same image when the relative position of the detected objects in each image is the same.

A second detector 430 may, based on an image determined to be a target image among the original image 401, the first image 402, and the second image 403, detect, as a second object, objects in the original image 401, the first image 402, and the second image 403 by using a neural network-based object detection model. For example, the second detector 430 may include software and hardware for performing operation 370 described above with reference to FIG. 3.

The image determined to be the target image among the original image 401, the first image 402, and the second image 403 may be input to the second detector 430 through a hardware configuration (e.g., a configuration of a switch 410). For example, when the resolution of the target image is predetermined to be the resolution of the first image 402, the switch 410 may be connected such that the first image 402 may always be input to the second detector 430. In another example, when the resolution of the target image adaptively varies, a connected direction of the switch 410 may vary depending on each frame of the original image 401.

Figure 5:
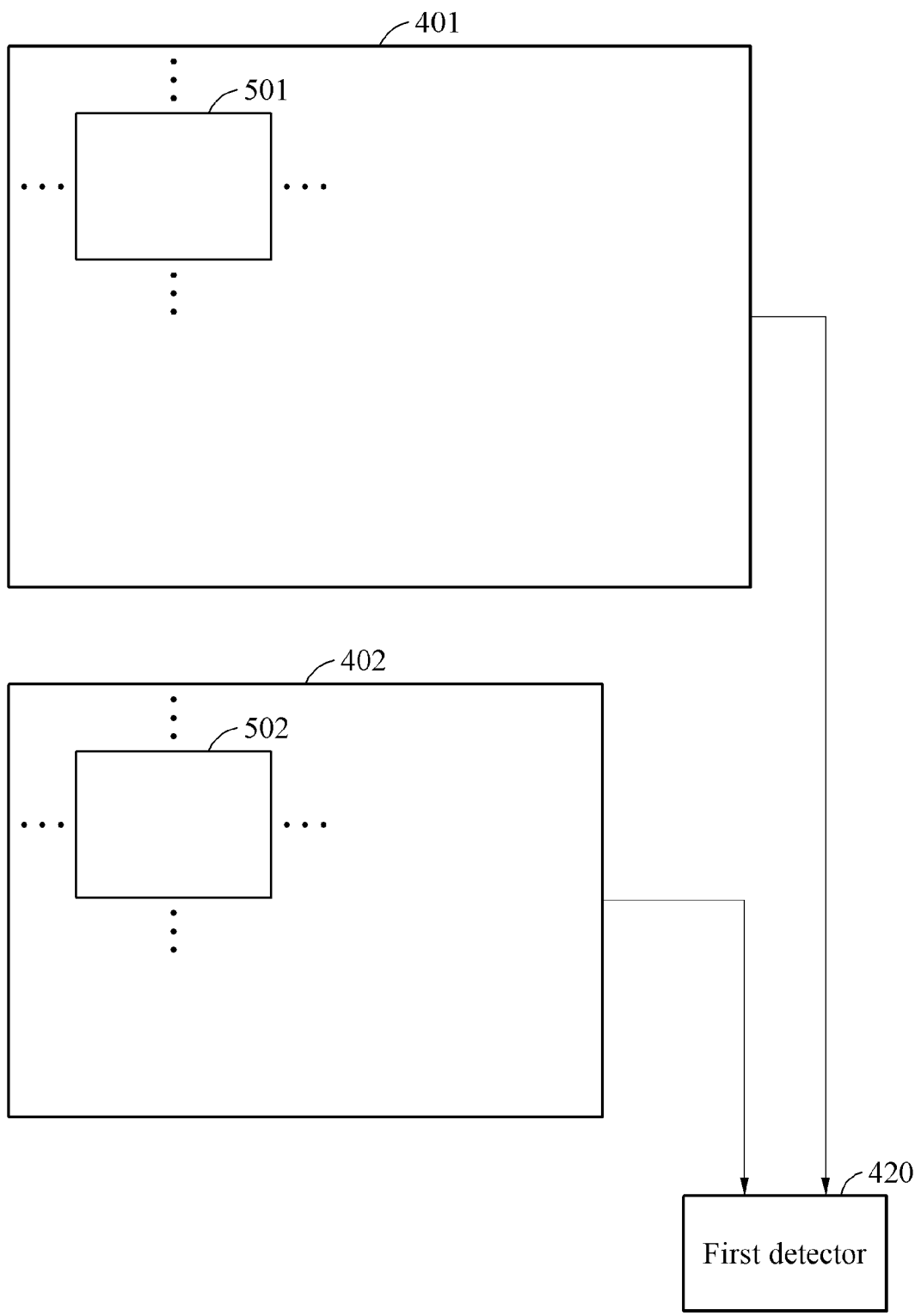
FIG. 5 is a diagram illustrating a method of detecting an object by scanning images, according to an example.

FIG. 5 is a diagram illustrating a method of detecting an object by scanning images, according to an example.

The first detector 420 may detect an object in the original image 401 by scanning the original image 401 by using an object detection filter 501. The object detection filter 501 may be a window for scanning pixels in the original image 401 in a sliding manner. The first detector 420 may detect an object in the first image 401 by scanning the first image 402 by using an object detection filter 502. The object detection filters 501 and 502 may be the same object detection filter.

The first detector 420 may detect objects of different sizes by scanning images of different resolutions by using the same object detection filter. For example, a person not detected in the original image 401 may be detected in the first image 402.

Although an object (e.g., an object of which posture is transformed or an object that is covered by another object) that does not match an object detection filter may not be detected, an object that is not detected by the first detector 420 may be detected by the second detector 430.

Figure 6:
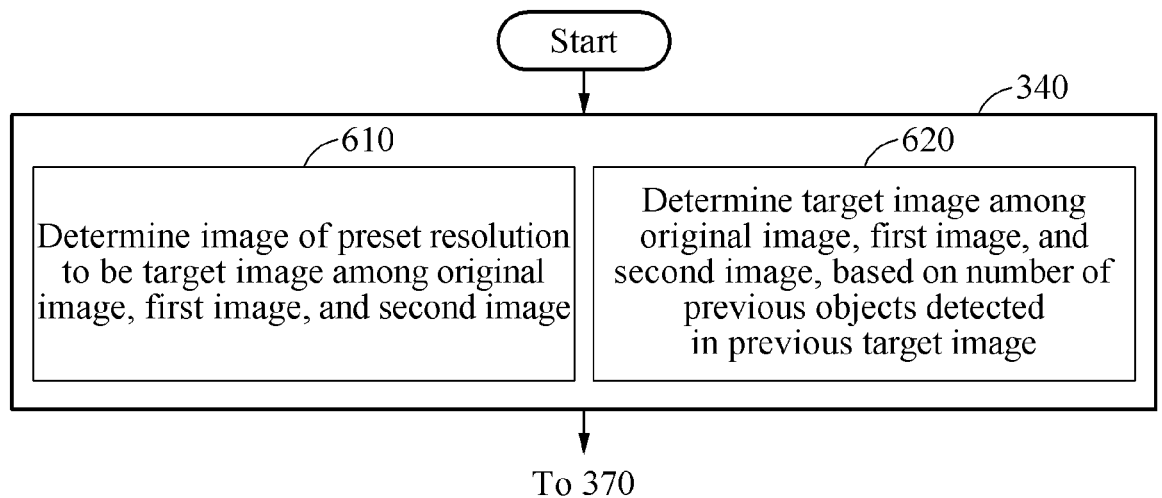
FIG. 6 is a diagram illustrating a method of determining a target image, according to an example.

FIG. 6 is a diagram illustrating a method of determining a target image, according to an example.

Operation 340 described above with reference to FIG. 3 may include operations 610 and 620 below. Operations 610 and 620 may be selectively performed.

In operation 610, the electronic device 200 may determine an image of a preset resolution to be a target image among an original image, a first image, and a second image. For example, as the image processing performance of the electronic device 200 increases, the resolution of an image predetermined to be the target image may increase. When the image processing performance of the electronic device 200 is not excellent enough to process the original image in real time, the first image or the second image of which resolution is lower than that of the original image may be predetermined to be the target image.

In another example, by predicting the image processing time needed for detecting an object in an image of each resolution, an image that satisfies a condition may be determined to be the target image.

In operation 620, the electronic device 200 may determine the target image among the original image, the first image, and the second image, based on the number of previous objects detected in a previous target image. The previous target image may be a target image determined for a previous original image, that is, a previous frame.

Additionally, the target image may be determined among the original image, the first image, and the second image, based on the number of previous objects detected in the previous target image, the generation of a new task to be processed through software, and the like.

In addition, a task generated through software may be maintained for a certain time until a function corresponding thereto is terminated, and a time allocated for image processing may decrease in proportion thereto.

Because temporally consecutive frames may include the almost similar number of objects, when a large number of objects is detected in the previous original image, the large number of objects may likely be detected in the current original image as well. As the number of objects included therein increases, image processing time may increase in proportion to the number of objects. Accordingly, for real-time performance, when the number of objects detected in the previous target image is great, or a task of new software is generated, the resolution of a target image to be processed may decrease compared to that of the previous target image. A method of determining a target image based on the number of previous objects is described in detail below with reference to FIG. 7.

Figure 7:
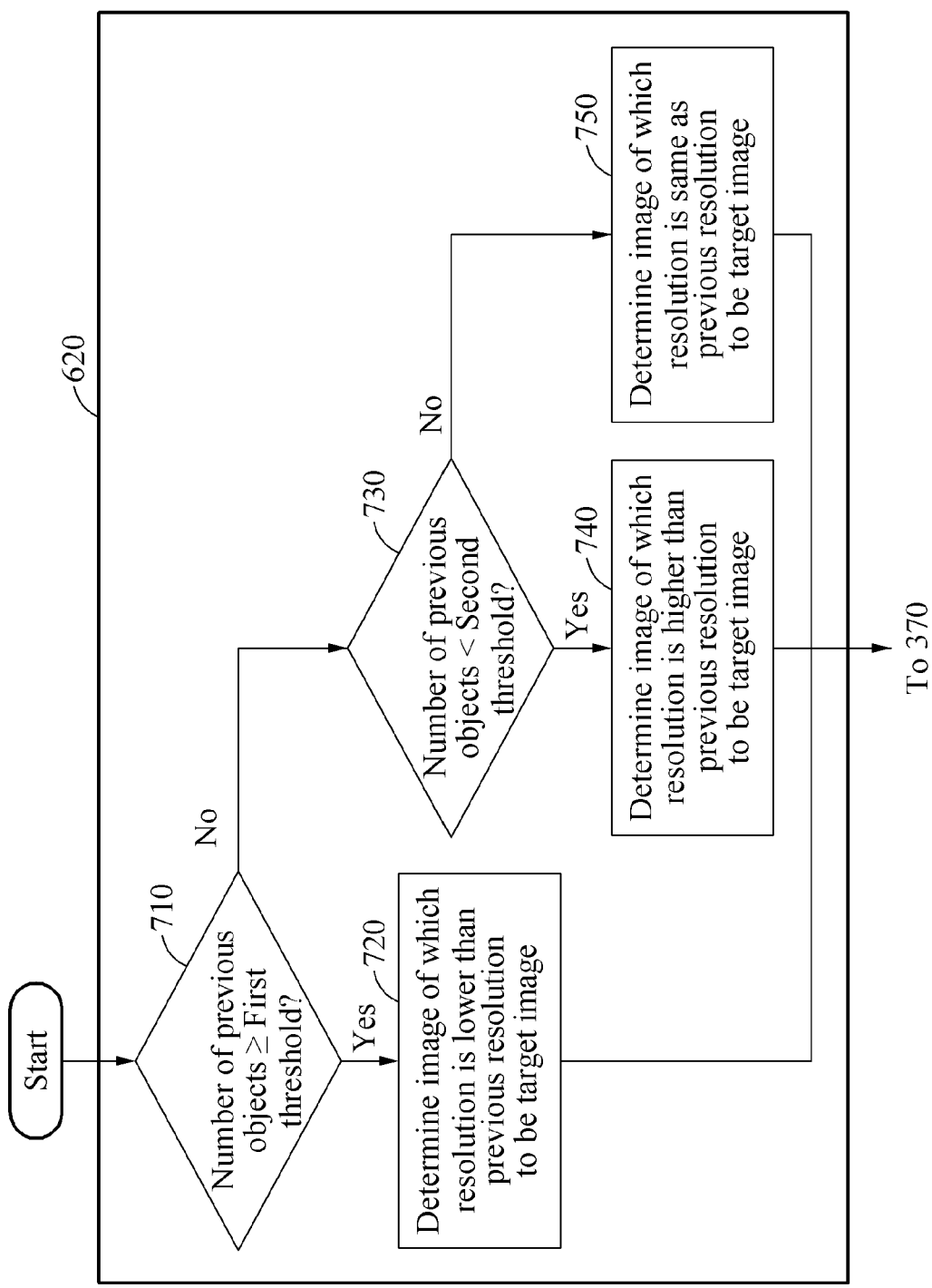
FIG. 7 is a diagram illustrating a method of determining a target image based on the number of previous objects, according to an example.

FIG. 7 is a diagram illustrating a method of determining a target image based on the number of previous objects, according to an example.

Operation 620 described above with reference to FIG. 6 may include operations 710 to 750 below.

In operation 710, the electronic device 200 may determine whether the number of previous objects detected in a previous target image is greater than or equal to a first threshold preset for the previous resolution of the previous target image. The first threshold may be preset based on the image processing capability of the processor 210 (e.g., a GPU) of the electronic device 200. For example, as the image processing capability of the processor 210 increases, the first threshold may increase.

In operation 720, when the number of previous objects is greater than or equal to the first threshold, the electronic device 200 may determine, to be the target image, an image of which resolution is lower than the previous resolution. For example, when the previous target image is a previous original image, a first image of which resolution is lower than that of an original image may be determined to be the target image.

When the number of previous objects is greater than or equal to the first threshold, the speed of processing an image of the previous resolution may not ensure real-time performance. Accordingly, the resolution of an image to be processed may decrease to increase image processing speed.

In operation 730, when the number of previous objects is less than the first threshold, the electronic device 200 may determine whether the number of previous objects is less than a second threshold preset for the previous resolution of the previous target image.

In operation 740, when the number of previous objects is less than the second threshold, the electronic device 200 may determine, to be the target image, an image of which resolution is higher than the previous resolution. For example, when the previous target image is a previous second image, the first image of which resolution is higher than that of a second image may be determined to be the target image.

When the number of previous objects is less than the second threshold, the speed of processing an image of the previous resolution may ensure real-time performance and may increase image processing quantity. Accordingly, the resolution of an image to be processed may increase to improve the accuracy of detection.

In operation 750, when the number of previous objects is greater than or equal to the second threshold, the electronic device 200 may determine, to be the target image, an image of which resolution is the same as the previous resolution. For example, when the previous target image is a previous first image, the first image may be determined to be the target image.

When the number of previous objects is greater than or equal to the second threshold, the speed of processing an image of the previous resolution may ensure real-time performance but may not increase image processing quantity. Accordingly, the previous resolution, for image processing, which may satisfy the speed and accuracy of detection may be maintained.

The methods according to the above-described examples may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs or DVDs; magneto-optical media such as optical discs; and hardware devices that are specially configured to store and perform program instructions, such as read-only memory (ROM), RAM, flash memory, and the like. Examples of program instructions include both machine code, such as produced by a compiler, and files containing higher-level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of example embodiments have been described above. Nevertheless, it should be understood that various modifications may be made to these example embodiments. Suitable results may be achieved if the described techniques are performed in a different order, and/or if components in a described system, architecture, device, or circuit are combined in a different manner, and/or replaced or supplemented by other components or their equivalents.

Accordingly, other implementations are within the scope of the following claims.

The invention claimed is:

1. An object detection method performed by an electronic device, the object detection method comprising:
   generating a first image by downscaling an original image to a first resolution;
   generating a second image by downscaling the original image to a second resolution that is different from the first resolution;
   detecting at least one first object by scanning at least one of the original image, the first image, and the second image by using a preset object detection filter;
   determining a target image among the original image, the first image, and the second image; and
   detecting at least one second object in the target image by using a neural network-based object detection model,
   wherein the determining the target image among the original image, the first image, and the second image comprises:
   determining whether the number of previous objects detected in a previous target image prior to the target image is greater than or equal to a first threshold that is preset for a previous resolution of the previous target image; and
   when the number of previous objects is greater than or equal to the first threshold, determining an image of a resolution that is lower than the previous resolution to be the target image.

2. The object detection method of claim 1, further comprising:
   storing the original image, the first image, and the second image, wherein
   the detecting the at least one second object in the target image by using the neural network-based object detection model comprises:
   detecting the second object in an image that is determined to be the target image among the original image, the first image, and the second image.

3. The object detection method of claim 1, wherein
   the neural network-based object detection model is based on a convolutional neural network (CNN).

4. The object detection method of claim 1, wherein
   the determining the target image among the original image, the first image, and the second image comprises:
   determining, to be the target image, an image of a preset resolution among the original image, the first image, and the second image.

5. The object detection method of claim 1, wherein
   the determining the target image among the original image, the first image, and the second image further comprises:
   determining whether the number of previous objects is less than a second threshold that is preset for the previous resolution of the previous target image; and
   when the number of previous objects is less than the second threshold, determining an image of a resolution that is higher than the previous resolution to be the target image.

6. The object detection method of claim 1, wherein
   the electronic device is comprised in an autonomous driving vehicle or a vehicle supporting advanced driver assistance systems (ADAS).

7. A non-transitory computer-readable storage medium storing instructions that, when executed by a processor, cause the processor to perform the object detection method of claim 1.

8. An electronic device for detecting an object, the electronic device comprising:
   a processor configured to execute a program for detecting an object; and
   a memory configured to store the program, wherein
   the program comprises:
   generating a first image by downscaling an original image to a first resolution;
   generating a second image by downscaling the original image to a second resolution that is different from the first resolution;
   detecting at least one first object by scanning at least one of the original image, the first image, and the second image by using a preset object detection filter;
   determining a target image among the original image, the first image, and the second image; and
   detecting at least one second object in the target image by using a neural network-based object detection model,
   wherein the determining the target image among the original image, the first image, and the second image comprises:
   determining whether the number of previous objects detected in a previous target image prior to the target image is less than a second threshold that is preset for the previous resolution of the previous target image; and
   when the number of previous objects is less than the second threshold, determining an image of a resolution that is higher than the previous resolution to be the target image.

9. The electronic device of claim 8, further comprising:
   a camera configured to generate the original image.

10. The electronic device of claim 8, wherein
    the program is further configured to store the original image, the first image, and the second image in the memory, wherein
    the detecting the at least one second object comprises:
    detecting the second object in an image that is determined to be the target image among the original image, the first image, and the second image.

11. The electronic device of claim 8, wherein
    the neural network-based object detection model is based on a convolutional neural network (CNN).

12. The electronic device of claim 8, wherein
    the determining the target image among the original image, the first image, and the second image comprises:
    determining, to be the target image, an image of a preset resolution among the original image, the first image, and the second image.

13. The electronic device of claim 8, wherein
    the electronic device is comprised in an autonomous driving vehicle or a vehicle supporting advanced driver assistance systems (ADAS).

* * * * *